United States Patent
Lee et al.

(10) Patent No.: US 7,132,208 B2
(45) Date of Patent: Nov. 7, 2006

(54) COMPOSITION FOR FORMING OVERCOAT LAYER FOR ORGANIC PHOTORECEPTOR AND ORGANIC PHOTORECEPTOR EMPLOYING OVERCOAT LAYER PREPARED FROM THE COMPOSITION

(75) Inventors: Nam-jeong Lee, Seoul (KR); Kyung-yol Yon, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/413,399

(22) Filed: Apr. 15, 2003

(65) Prior Publication Data

US 2003/0199620 A1    Oct. 23, 2003

(30) Foreign Application Priority Data

Apr. 16, 2002    (KR) .................. 10-2002-0020596

(51) Int. Cl.
*G03G 5/147* (2006.01)
*C08F 8/00* (2006.01)
*C08L 29/04* (2006.01)

(52) U.S. Cl. .................. 430/66; 430/67; 430/132; 399/116; 399/159; 525/58; 525/61; 525/342

(58) Field of Classification Search ............. 430/66.67, 430/132; 399/116, 159; 524/524, 188, 114, 524/263, 264, 265; 525/58, 61, 342
See application file for complete search history.

(56) References Cited

U.S. PATENT DOCUMENTS 5,430,526 A * 7/1995 Ohkubo et al. ............. 399/159
5,731,117 A    3/1998 Ferrar et al.
5,995,230 A   11/1999 Madlener et al.
6,001,522 A * 12/1999 Woo et al. .................. 430/65
6,039,896 A *  3/2000 Miyamoto et al. .......... 252/511
6,187,491 B1   2/2001 Ferrar et al.
6,203,910 B1*  3/2001 Fukuo et al. ................ 428/413

FOREIGN PATENT DOCUMENTS

| JP | 60-18554    | * | 1/1985  |
| JP | 2001-142234 |   | 5/2001  |
| JP | 2001-142244 |   | 5/2001  |
| JP | 2001-265016 |   | 9/2001  |
| JP | 2001-272807 |   | 10/2001 |

OTHER PUBLICATIONS

US Patent & Trademark Office English-language translation of JP 60-18554 (pub. Jan. 1985).*
Grant, R., et. al, ed., *Grant & Hackh's Chemical Dictionary*, 5th edition, McGraw-Hill Book Company, NY (1987), pp. 5-6.*
Office Action dated Jul. 12, 2005 which corresponds with the Japanese Patent Application No. 2003-103870 (Office Action in Japanese was filed on Sep. 22, 2005).

* cited by examiner

*Primary Examiner*—Janis L. Dote
(74) *Attorney, Agent, or Firm*—Staas & Halsey LLP

(57) ABSTRACT

A composition forms an overcoat layer for an organic photoreceptor by combining an organic silane compound, an acrylic polymer, polyvinyl butyral and a solvent. The organic photoreceptor has increased electrical and mechanical properties, leading to improved life characteristics. Also, unlike when a single material of either acrylic polymer or silsesquioxane is used in forming an overcoat layer, when the composition of the present invention is used, it is not necessary to coat a primer or an adhesive layer, thereby simplifying a coating process and reducing the cost required in forming additive layers.

19 Claims, 1 Drawing Sheet

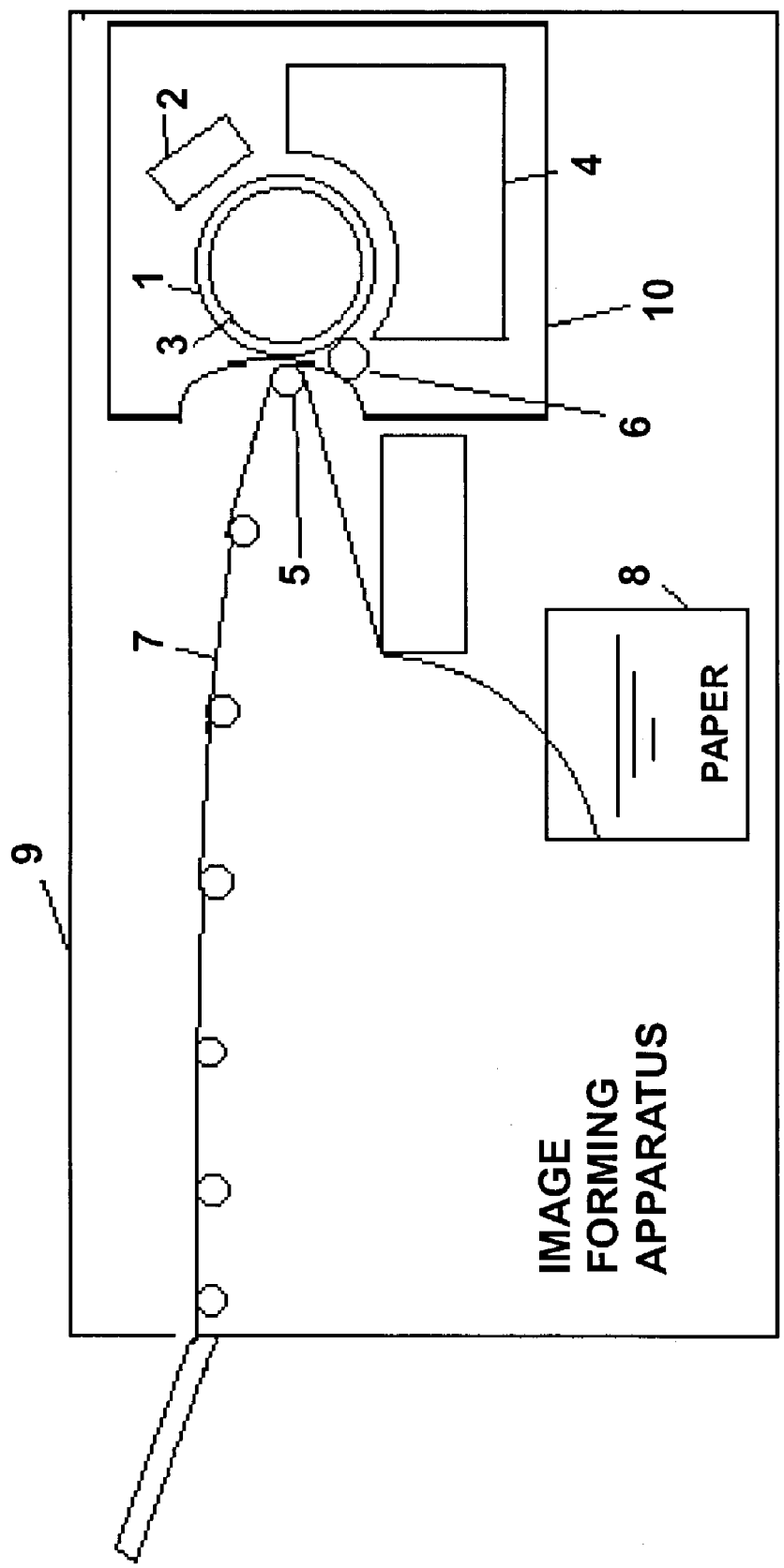

COMPOSITION FOR FORMING OVERCOAT LAYER FOR ORGANIC PHOTORECEPTOR AND ORGANIC PHOTORECEPTOR EMPLOYING OVERCOAT LAYER PREPARED FROM THE COMPOSITION

CROSS-REFERENCE TO RELATED APPLICATIONS

This application claims the benefit of Korean Application No. 2002-20596, filed Apr. 16, 2002, in the Korean Intellectual Property Office, the disclosure of which is incorporated herein by reference.

BACKGROUND OF THE INVENTION

1. Field of the Invention

The present invention relates to a composition to form an overcoat layer for an organic photoreceptor and an organic photoreceptor employing an overcoat layer prepared from the composition. More particularly, the invention relates to a composition forming an overcoat layer constituting an outermost layer of an organic photoreceptor used to form an electrophotographic image, and an organic photoreceptor having good electrical and mechanical properties and improved adhesion of the overcoat layer by employing the overcoat layer prepared from the composition.

2. Description of the Related Art

In electrophotography, an organic photoreceptor includes a photosensitive layer formed on a conductive base and is in the form of a plate, disk, sheet, belt, or drum.

The principles of electrophotographically forming an image will be described briefly below. First, the surface of the organic photoreceptor is electrostatically uniformly charged and irradiated with a laser beam. Positive and negative charges are generated in portions into which a laser beam is irradiated and migrate to the surface. As the surface charges are neutralized, the surface potential in an exposed area is changed so that a latent image is formed.

Thereafter, when the latent image is developed with a toner, a visible image is formed on the surface of the organic photoreceptor. The formed image is transferred to the surface of a receiver, such as paper. The imaging process is repeated.

Both single layer and multilayer photoconductive elements have been used. In the single layer embodiment, a charge transport material and a charge generating material are combined with a polymeric binder, and then are coated on the conductive base. In the multilayer embodiment, the charge transport material and charge generating material are in the form of separate layers, each of which can optionally be combined with a polymeric binder, and then coated on the conductive base. Two arrangements are possible. In one arrangement (the "dual layer" arrangement), the charge generating layer is coated on the conductive base, and the charge transport layer is coated on top of the charge generating layer. In an alternate arrangement (the "inverted dual layer" arrangement), the order of the charge transport layer and charge generating layer is reversed.

In both the single and multilayer photoconductive elements, the purpose of the charge generating material is to generate charge carriers (i.e., holes and electrons) upon exposure to light. The purpose of the charge transport material is to accept these charge carriers and transport them through the charge transport layer in order to discharge a surface charge on the photoconductive element.

In general, the photoreceptor easily wears due to friction against a toner, a roller or a cleaning blade during an imaging process, so that the thickness thereof decreases, and the life thereof is shortened. For this reason, an overcoat layer is coated on the organic photoreceptor.

In manufacturing the overcoat layer of the organic photoreceptor, the use of silsesquioxane-based silicon hard-coat materials is disclosed in U.S. Pat. Nos. 6,187,491 and 5,731,117.

The silicon hard-coat materials have good wear resistance and may easily introduce chemical functional groups and adjust mechanical and electrical properties. Also, since alcoholic solvents used in forming an overcoat layer do not adversely affect a general organic photoreceptor, they are widely used as overcoat forming materials.

However, since such a silicon hard-coat material has weak adhesion to a photoreceptor so that it is easily peeled off or worn, it is necessary to form an adhesive layer or primer layer thereon.

Such an additional step of forming the adhesive layer results in an increase in cost. Also, electrical characteristics of an organic photoreceptor, such as exposure potential or residual potential, are degraded.

SUMMARY OF THE INVENTION

The present invention provides a composition to form an overcoat layer for an organic photoreceptor with improved electrical properties and life characteristics while wear resistance and adhesion are enhanced, and an organic photoreceptor by which forming a separate adhesive layer is not necessary by employing an overcoat layer prepared from the composition.

In accordance with an aspect of the present invention, a composition forms an overcoat layer for an organic photoreceptor, the composition comprising an organic silane compound represented by Formula 1, an acrylic polymer, polyvinyl butyral and a solvent:

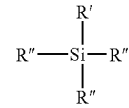

Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or halogen atom.

In accordance with another aspect of the present invention, an organic photoreceptor includes a conductive base, a photosensitive layer formed on the conductive base, and an overcoat layer formed on the photosensitive layer and has a product obtained by coating and thermally treating the overcoat layer coat composition.

Additional aspectss and/or advantages of the invention will be set forth in part in the description which follows and, in part, will be obvious from the description, or may be learned by practice of the invention.

BRIEF DESCRIPTION OF THE DRAWING

These and/or other aspects and advantages of the present invention will become apparent and more readily appreciated from the following description of the embodiments, taken in conjunction with the accompanying drawing:

FIGURE is a block diagram of an embodiment of an organic photoreceptor cartridge/drum and an image forming apparatus in accordance with an embodiment of the present invention.

DETAILED DESCRIPTION OF THE INVENTION

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

The present invention features an organic photoreceptor which overcomes problems associated when silsesquioxane, which is a hydrolyzed and polycondensated product of an organic silane compound represented by Formula 1, and acrylic polymer and polyvinyl butyral are used independently by simultaneously using these materials in forming an overcoat layer, and which has improved life characteristics by forming an overcoat layer having enhanced electrical properties and wear resistance.

If the overcoat layer is formed by using silsesquioxane and an acrylic polymer simultaneously, the step of coating a primer or an adhesive layer, which is performed to overcome the weak adhesion of the overcoat layer, can be omitted, thus simplifying the process. Here, silsesquioxane represents a trifunctional polysiloxane.

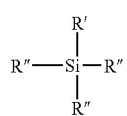

Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or halogen atom.

In R' and R" of Formula 1, examples of the $C_1$–$C_{20}$ alkyl group include a methyl, an ethyl, a propyl and a butyl group.

Examples of the organic silane compound of Formula 1 include one or more selected from the group consisting of 3-glycidoxypropyl trimethoxysilane (Z-6040; DOW CORNING, KBM 403; SHIN-ETSU), methyltrimethoxysilane (Z-6070; DOW CORNING, KBM 13; SHIN-ETSU), methacryloxypropyltrimethoxysilane (Z-6030, KBM502), aminopropyltrimethoxysilane (Z-6011, KBM903), aminoethylaminopropyltrimethoxysilane (KBM603), trifluoropropyltrimethoxysilane (KBM7103), heptadecafluorodecyltrimethoxysilane (KBM7803), isocyanatopropyltriethoxysilane (KBE9007), isocyanatopropyltrimethoxysilane, aminopropyltriethoxysilane (KBE903), 3-glycidoxypropyltriethoxysilane, methacryloxypropyltriethoxysilane, trifluoropropyltriethosysilane, heptadecafluoro-decyltriethoxysilane and aminoethylaminopropyltriethoxysilane (KBE603).

The acrylic polymer has a good charge mobility to maintain good electrical properties of a photosensitive layer, and a high durability against a toner, in particular, a liquid toner, and is exemplified by methyl methacrylate-methacrylic acid copolymer, which is represented by Formula 2.

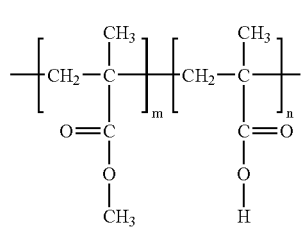

Formula 2 wherein m is 10 to 50 mol %, and n is 50 to 90 mol %.

The weight average molecular weight of the methyl methacrylate-methacrylic acid copolymer is preferably 1,000 to 10,000. If the weight average molecular weight of the methyl methacrylate-methacrylic acid copolymer is out of the above range, coating of an overcoat layer forming composition is quite difficult to perform, and the methyl methacrylate-methacrylic acid copolymer is undesirably less soluble in an alcoholic solvent.

The acrylic polymer is preferably contained in an amount of 10 to 200 parts by weight, more preferably 15 to 50 parts by weight, based on 100 parts by weight of the organic silane compound represented by Formula 1. If the amount of the acrylic polymer is less than 10 parts by weight, electrical advantages of the acrylic polymer, in particular, the methylmethacrylate-methacrylic acid copolymer, are not exerted. If the amount is greater than 200 parts by weight, the wear resistance of the compound is lowered.

The overcoat layer forming composition according to the present invention further includes a polyvinyl butyral resin represented by Formula 3 in addition to the organic silane compound of Formula 1 and the acrylic polymer of Formula 2. Addition of such a polyvinyl butyral resin further increases adhesion of the overcoat layer with respect to the photosensitive layer.

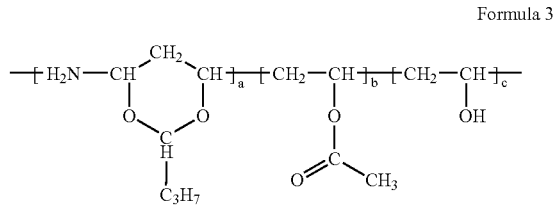

Formula 3 wherein a is 60 to 80 mol %, b is 0 to 10 mol %, and c is 0 to 40 mol %.

The amount of the polybutyral resin is 1 to 20 parts by weight based on 100 parts by weight of the organic silane compound of Formula 1. If the amount of the polyvinyl butyral resin is less than 1 part by weight, the adhesion of the overcoat layer is lowered. If the amount of the polyvinyl butyral resin is greater than 20 parts by weight, wear resistance characteristics of main component materials, that is, the organic silane compound and the acrylic polymer, undesirably deteriorate.

The weight average molecular weight of the polyvinyl butyral resin is preferably in the range of 40,000 to 120,000. If the weight average molecular weight of the polyvinyl butyral resin is out of the above range, coating of an overcoat layer forming composition is quite difficult to perform, compatibility with a polymer mixed therewith is poor, and the polyvinyl butyral resin is undesirably less soluble in an alcoholic solvent.

In the present invention, the solvent dissolves the organic silane compound of Formula 1 and the acrylic polymer, and useful examples thereof include a cosolvent of at least one alcoholic solvent selected from the group consisting of ethanol, butanol, methanol and isopropanol, and water. The amount of water is preferably 5 to 30 parts by weight based on 100 parts by weight of the alcoholic solvent. The total amount of the solvent used is in the range of 400 to 9900 parts by weight based on 100 parts by weight of solid content of the overcoat layer forming composition. If the amount of the solvent is greater than the above range, the excess gives rise to undesirable coating capability of the composition, that is, the coating is too thin to serve as an overcoat layer. If the amount of the solvent is less than the above range, the shortage results in undesirable properties of the organic silane compound of Formula 1 and the acrylate polymer in view of solubility.

The overcoat layer forming composition according to the present invention may further include a hydrolysis catalyst in an amount of 5 to 20 parts by weight based on 100 parts by weight of the organic silane compound of Formula 1. As described above, addition of the hydrolysis catalyst facilitates hydrolysis of the organic silane compound of Formula 1 and increases stability of the hydrolyzed and polycondensated product of the organic silane compound. A typical example of the hydrolysis catalyst is acetic acid.

A method of manufacturing an electrophotographic organic photoreceptor using the overcoat layer forming composition according to the present invention is described below. First, a photosensitive layer is formed on an conductive base. The photosensitive layer may be formed by sequentially stacking a charge transport layer containing a charge transport material, and a charge generating layer containing a charge generating material, or reversely stacking the layers. Otherwise, the photosensitive layer may have a single layered structure containing a charge transport material and a charge generating material.

The charge transport layer is formed by coating a composition including a charge transport material a, binder and an organic solvent, and drying the resultant structure. The charge generating layer is formed by coating a composition including a charge generating material, a binder and an organic solvent, and drying the resultant structure.

Examples of the charge transport material include a pyrazoline derivative, a fluorene derivative, an oxadiazole derivative, a stilbene derivative, a hydrazone derivative, a carbazole hydrazone derivative, polyvinyl carbazole, polyvinylpyrene and polyacenaphthylene. Examples of the charge generating material include a metal-free phthalocyanine (e.g., Progen 1x-form metal-free phthalocyanine, ZENECA, INC.), and a metal phthalocyanine such as titanium phthalocyanine, copper phthalocyanine, oxytitanium phthalocyanine, or hydroxygallium phthalocyanine. The amounts of these materials are in the conventional range. In particular, the charge transport material is used in an amount of 35 to 65 parts by weight based on 100 parts by weight of the charge transport layer forming composition, and the charge generating material is used in an amount of 55 to 85 parts by weight based on 100 parts by weight of the charge generating layer forming composition.

The binder dissolves or disperses the charge transport material or charge generating material. Examples thereof include polyvinyl butyral, polycarbonate, poly(styrene-co-butadiene), modified acryl polymer, polyvinyl acetate, styrene-alkyd resin, soya-alkyl resin, polyvinyl chloride, polyvinylidene chloride, polyacrylonitrile, polyacrylic acid, polyacrylate, polymethacrylate, styrene polymer, alkyd resin, polyamide, polyurethane, polyester, polysulfone, polyether and combinations thereof. In particular, polycarbonate and polyvinyl butyral are used in the present invention. The binder is used in an amount of 15 to 65 parts by weight based on 100 parts by weight of the charge generating layer forming composition or charge transport layer forming composition.

Examples of the solvent forming the charge transport layer forming composition and the charge generating layer forming composition include tetrahydrofuran, methylenechloride, chloroform, dichloroethane, trichloroethane, chlorobenzene, and acetate-based solvent, and the amount of the solvent is in the range of 70 to 99 parts by weight based on 100 parts by weight of solid content of the charge generating layer forming composition or charge transport layer forming composition.

The coating method of the charge generating layer forming composition and the charge transport layer forming composition is not particularly limited, but ring coating or dip coating is preferred when the conductive base is in the form of a drum.

As described above, after forming a photosensitive layer on the conductive base, the overcoat layer forming composition according to the present invention is coated on the photosensitive layer and is thermally treated to form an overcoat layer, thus completing the electrophotographic photoreceptor according to the present invention. The thermal treatment is preferably performed at a temperature in the range of 80 to 140° C., more preferably 100 to 130° C.

When the organic silane compound of Formula 1 is hydrolyzed in the composition in the presence of water, it exists in a state of a silanol group (Si—OH) or a partially hydrated and polycondensated state, and is then subjected to hydrolysis and polycondensation during thermal treatment after coating, thus forming silsesquioxane. A mixture of the acrylic polymer and the polyvinyl butyral resin may participate in the reaction of forming silsesquioxane according to a presence or an absence of a functional group existing in the mixture, e.g., a hydroxy or a carboxyl group. Thus, the finally formed overcoat layer may include silsesquioxane, which is a hydrolyzed and polycondensated product of the organic silane compound Formula 1, acrylic polymer and polyvinyl butyral resin, or may include a crosslinked product of silsesquioxane, an acrylic polymer and a polyvinyl butyral resin.

The overcoat layer forming composition may be coated by spin coating, dip coating or ring coating. Ring coating or dip coating is preferred when the conductive base is in the form of a drum.

In the organic photoreceptor according to the present invention, the overall thickness of the photosensitive layer is in the range of 5.1 to 26 µm. Generally, the charge generating layer has a thickness of 0.1 to 1.0 µm, the charge transport layer has a thickness of 5 to 25 µm, and the conductive base, in particular, the drum substrate, has a thickness of 0.5 to 2 mm. The overcoat layer has a thickness of 0.1 to 10 μm. If the thickness of the overcoat layer is less than 0.10 μm, the ability of the overcoat layer protecting underlying layers is weak. If the thickness of the overcoat layer is greater than 10 μm, electrical properties of the overcoat layer undesirably deteriorate. For example, the exposure potential of the overcoat layer may increase.

The organic photoreceptor according to the present invention may further include additional layers. Such additional layers are generally known layers, for example, a charge blocking layer. The charge blocking layer may be formed between the conductive base and the charge transport layer, improving adhesion therebetween.

In the electrophotographic imaging process using the organic photoreceptor, dry or liquid toner may be used.

In electrophotography, the organic photoreceptor for conventional dry-type toner is applied to the liquid toner, and contacts a paraffinic solvent, which is one of the main components of the liquid toner, resulting in cracking or crazing, or dissolving some components of the organic photoreceptor.

On the other hand, since the organic photoreceptor according to an embodiment of the present invention has high resistance to a paraffinic solvent, it can be advantageously used in an electrophotographic imaging process using liquid toner, and the above-described problems can be avoided.

Hereinafter, the present invention will be described in greater detail with reference to the following examples. The following examples are for illustrative purposes and are not intended to limit the scope of the invention.

EXAMPLE 1

0.488 g Z-6070 (DOW CORNING), 0.488 g methylmethacrylate-methacrylic acid copolymer mixed in a molar ratio of 25:75, 0.025 g polyvinyl butyral (BM-S, SEKISUI CO., Japan,) 0.05 g acetic acid, 0.19 g water and 8.76 g ethanol were well mixed to give a transparent solution of an overcoat layer forming composition.

The composition was coated on a negatively charged photoreceptor drum (SAMSUNG ELECTROMECHANICS CO., Korea) using a ring coater, and was crosslinked at 130° C. for 10 minutes to form an overcoat layer. As a result, a complete organic photoreceptor was obtained. Here, the coating speed was 100 mm/min.

EXAMPLE 2

An overcoat layer was formed in the same manner as in Example 1, except that Z-6070 (DOW CORNING), a methylmethacrylate-methacrylic acid copolymer, BM-S (SEKISUI CO., Japan) and acetic acid were used in amounts of 0.475 g, 0.475 g, 0.05 g, and 0.048 g, respectively, thus obtaining a complete organic photoreceptor.

EXAMPLE 3

An overcoat layer was formed in the same manner as in Example 1, except that Z-6070 (DOW CORNING), a methylmethacrylate-methacrylic acid copolymer, BM-S (SEKISUI CO., Japan), acetic acid and ethanol were used in amounts of 0.45 g, 0.45 g, 0.1 g, 0.045 g and 8.78 g, respectively, thus obtaining a complete organic photoreceptor.

COMPARATIVE EXAMPLE 1

An overcoat layer was formed in the same manner as in Example 1, except that Z-6070 (DOW CORNING), acetic acid, water and isopropanol were used in amounts of 3.0 g, 0.3 g, 1.04 g and 5.66 g, respectively, thus obtaining a complete organic photoreceptor.

COMPARATIVE EXAMPLE 2

An overcoat layer was formed in the same manner as in Example 1, except that 2.1 g Z-6070 (DOW CORNING), 0.5 g methylmethacrylate-methacrylic acid copolymer mixed in a molar ratio of 25:75, 0.05 g acetic acid, 0.173 g water and 8.78 g ethanol were well mixed to give a transparent solution of overcoat layer forming composition, thus obtaining a complete organic photoreceptor.

COMPARATIVE EXAMPLE 3

0.5 g methylmethacrylate-methacrylic acid copolymer, 4.75 g water and 4.75 g ethanol were well mixed to obtain a transparent solution of an overcoat layer forming composition.

The composition was ring-coated on a negatively charged photoreceptor drum (SAMSUNG ELECTROMECHANICS, Korea) using a ring coater, and was dried at 100° C. for 10 minutes to form an overcoat layer, thus obtaining a complete organic photoreceptor. Here, the coating speed was 100 mm/min.

Film states of organic photoreceptors employing overcoat layers prepared in Examples 1–3 and Comparative Examples 1–3, and adhesive forces and electrical properties of the overcoat layers were evaluated by the following methods, and the results thereof are listed in Table 1.

(1) Coating Status of the Organic Photoreceptor

Before and after dipping in NORPAR 12 for 48 hours, the organic photoreceptors were visually evaluated to determine whether cracking or crazing occurred or not.

(2) Adhesive Force of the Overcoat Layer

Adhesive forces of the overcoat layers were evaluated using a 180° C. peel tester.

(3) Electrostatic Properties

Electrostatic properties of the organic photoreceptors were evaluated using PDT2000 (QEA Co.) while observing a change in the color of NORPAR 12 before and after dipping in NORPAR 12 for approximately 48 hours. Changes in charge potential and exposure potential were measured after repeating charge-exposure-erase cycling 100 times.

TABLE 1

| Evaluation item | Example 1 | Example 2 | Example 3 | Comparative Example 1 | Comparative Example 2 | Comparative Example 3 |
|---|---|---|---|---|---|---|
| Coating weight per unit area (g/cm$^2$) | 1.64 | 1.65 | 1.79 | 0.65 | 1.57 | 1.54 |

TABLE 1-continued

| Evaluation item | Example 1 | Example 2 | Example 3 | Comparative Example 1 | Comparative Example 2 | Comparative Example 3 |
|---|---|---|---|---|---|---|
| Charge potential (V) | | | | | | |
| Before coating | 700 | 708 | 709 | 764 | 763 | 723 |
| After coating | 702→702* | 713→705 | 711→685 | 766→730 | 764→764 | 746→740 |
| After dipping in NORPAR 12 | 698→698 | 704→699 | 698→681 | 784→732 | 727→725 | 721→719 |
| Exposure potential (V) | | | | | | |
| Before coating | 67 | 68 | 62 | 42 | 39 | 59 |
| After coating | 71→83 | 69→81 | 63→73 | 61→146 | 49→55 | 69→75 |
| After dipping in NORPAR 12 | 67→73 | 59→70 | 59→67 | 71→139 | 70→77 | 74→87 |
| Adhesion | Good | Good | Good | Easily peeled off | Peeled off | Peeled off |
| Coating status | No cracking | No cracking | No cracking | Cracking | No cracking | No cracking |

*Charge-Exposure-Erase cycling: (1st cycle)→(100th cycle)

As shown in Table 1, the organic photoreceptor prepared in Comparative Example 1 showed a great increase in exposure potential, even if it had a thin coating, and the adhesion between an overcoat layer and a photosensitive layer was so ineffective that the overcoat layer was easily peeled off. After dipping in NORPAR 12, cracking occurred to the surface of the overcoat layer, resulting in a poor coating status. In Comparative Examples 2–3, whereas there were little changes in the charge potential and the exposure potential, suggesting relatively good electrostatic properties, the adhesion between each overcoat layer and each photosensitive layer was so poor that the overcoat layer was easily peeled off.

On the other hand, the organic photoreceptors prepared in Examples 1–3 showed relatively stable charge potential and exposure potential, and adhesion of each overcoat layer was good, compared to those prepared in Comparative Examples 1–3. Also, no cracking occurred after dipping in NORPAR 12.

The organic photoreceptor according to the present invention has enhanced electrical and mechanical properties, leading to improved life characteristics. Also, unlike when a single material of either acrylic polymer or silsesquioxane is used in forming an overcoat layer, when the present invention is used, it is not necessary to coat a primer or an adhesive layer, thus simplifying a coating process and reducing the cost required in forming additive layers. Further, in the electrophotographic imaging process, a decrease in charge potential and a rise in a residual potential can be reduced, thus improving the life characteristics of the organic photoreceptor. Also, since the organic photoreceptor has a high durability against a liquid toner, in particular, a paraffinic solvent, the organic photoreceptor of the present invention may be advantageously used in an electrophotographic imaging process using the liquid toner. Further, since the overcoat layer forming composition according to the present invention is easily adjusted in viscosity, a limitation in the coating thickness can be overcome.

As shown in the FIGURE, the present invention may be utilized in an organic photoreceptor cartridge 10, an organic photoreceptor drum 3, or in an image forming apparatus 9. The organic photoreceptor cartridge 10 typically comprises an electrophotographic organic photoreceptor 1 and at least one of a charging device 2 that charges the electrophotographic organic photoreceptor 1, a developing device 4 which develops an electrostatic latent image formed on the electrophotographic organic photoreceptor 1, and a cleaning device which cleans a surface of the electrophotographic organic photoreceptor 1. The organic photoreceptor cartridge 10 is may be attached to and detached from the image forming apparatus 9, and the electrophotographic organic photoreceptor 1 is described more fully above.

The organic photoreceptor drum 3 for an image forming apparatus 9, generally includes a drum having a conductive base coated on the drum, wherein the drum is attachable to and detachable from the image forming apparatus and that includes an electrophotographic organic photoreceptor 1 installed thereon, wherein the electrophotographic organic photoreceptor 1 is described more fully above.

Generally, the image forming apparatus 9 includes a photoreceptor unit (e.g., an organic photoreceptor drum 3), a charging device 2 which charges the photoreceptor unit, an imagewise light irradiating unit which forms an electrostatic latent image on the photoreceptor unit, a developing device 4 which and the electrostatic latent image with a toner to form a toner image on the photoreceptor unit, and a transfer device 5 which transfers the toner image onto a receiving material, wherein the photoreceptor unit comprises an electrophotographic organic photoreceptor 1 as described in greater detail above. In the embodiment shown in FIGURE, the paper from a paper supply unit 8 moves along the paper path 7.

Although a few preferred embodiments of the present invention have been shown and described, it would be appreciated by those skilled in the art that changes may be made in this embodiment without departing from the principles and spirit of the invention, the scope of which is define in the claims and their equivalents.

What is claimed is:

1. A composition to form an overcoat layer for an organic photoreceptor, the composition comprising an organic silane compound represented by Formula 1, an acrylic polymer, a polyvinyl butyral resin and a solvent:

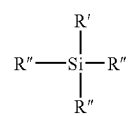

Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or a halogen atom, wherein the acrylic polymer is a methyl methacrylate-methacrylic acid copolymer represented by Formula 2, and the amount thereof is in the range of 10 to 200 parts by weight based on 100 parts by weight of the organic silane compound represented by Formula 1:

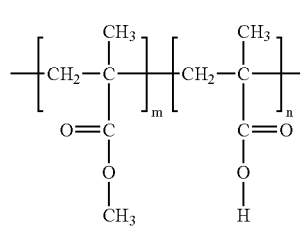

Formula 2 wherein m is 10 to 50 mol %, and n is 50 to 90 mol %.

2. The composition of claim 1, wherein the polyvinyl butyral resin is represented by Formula 3, and the amount thereof is in the range of 1 to 20 parts by weight based on 100 parts by weight of the organic silane compound represented by Formula 1:

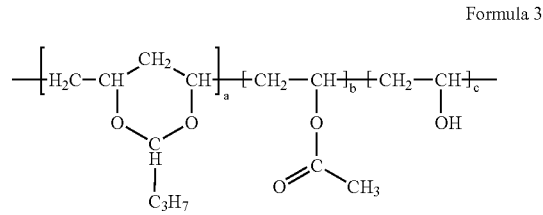

Formula 3 wherein a is 60 to 90 mol %, b is 0 to 10 mol %, and c is 0 to 40 mol %.

3. The composition of claim 1, wherein the organic silane compound represented by formula 1 is at least one selected from the group consisting of 3-glycidoxypropyltrimethoxysilane, methacryloxypropyltrimethoxysilane, aminopropyltrimethoxysilane, aminoethylaminopropyltrimethoxysilane, trifluoropropyltrimethoxysilane, heptadecafluorodecyltrimethoxysilane, isocyanatopropyltrimethoxysilane, 3-glycidoxypropyltriethoxysilane, methacryloxypropyltriethoxysilane, aminopropyltriethoxysilane, aminoethylaminopropyltriethoxysilane, trifluoropropyltriethoxysilane, heptadecafluorodecyltriethoxysilane, and isocyanatopropyltriethoxysilane.

4. The composition of claim 1, further comprising a hydrolysis catalyst in an amount of 5 to 20 parts by weight based on 100 parts by weight of the organic silane compound represented by Formula 1.

5. The composition of claim 4, wherein the hydrolysis catalyst is acetic acid.

6. The composition of claim 1, wherein the solvent is a cosolvent of at least one alcoholic solvent selected from the group consisting of methanol, ethanol, isopropanol and butanol, and water, and the amount of the solvent is in the range of 400 to 9900 parts by weight based on 100 parts by weight of a solid content of the overcoat layer forming composition.

7. An organic photoreceptor comprising:
a conductive base;
a photosensitive layer formed on the conductive base; and
an overcoat layer formed on the photosensitive layer and having a product obtained by coating and thermally treating an overcoat layer forming composition comprising an organic silane compound represented by Formula 1, an acrylic polymer, a polyvinyl butyral resin and a solvent:

Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or a halogen atom, wherein the product includes one of:
silsesquioxane, which is a hydrolyzed and polycondensated product of the organic silane compound Formula 1, the acrylic polymer and the polyvinyl butyral resin; or
a crosslinked product of silsesquioxane, the acrylic polymer and the polyvinyl butyral resin.

8. The organic photoreceptor of claim 7, the acrylic polymer is a methyl methacrylate-methacrylic acid copolymer represented by Formula 2, and the amount thereof is in the range of 10 to 200 parts by weight based on 100 parts by weight of the organic silane compound represented by Formula 1:

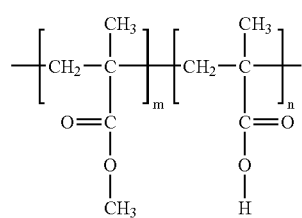

Formula 2 wherein m is 10 to 50 mol %, and n is 50 to 90 mol %.

9. The organic photoreceptor of claim 7, wherein the organic silane compound represented by formula 1 is at least one selected from the group consisting of 3-glycidoxypropyltrimethoxysilane, methacryloxypropyltrimethoxysilane, aminopropyltrimethoxysilane, aminoethylaminopropyltrimethoxysilane, trifluoropropyltrimethoxysilane, heptadecafluorodecyltrimethoxysilane, isocyanatopropyltrimethoxysilane, 3-glycidoxypropyltriethoxysilane, methacryloxypropyltriethoxysilane, aminopropyltriethoxysilane, aminoethylaminopropyltriethoxysilane, trifluoropropyltriethoxysilane, heptadecafluorodecyltriethoxysilane, and isocyanatopropyltriethoxysilane.

10. The organic photoreceptor of claim 7, wherein the polyvinyl butyral resin is represented by Formula 3, and the amount thereof is in the range of 1 to 20 parts by weight based on 100 parts by weight of the organic silane compound represented by Formula 1:

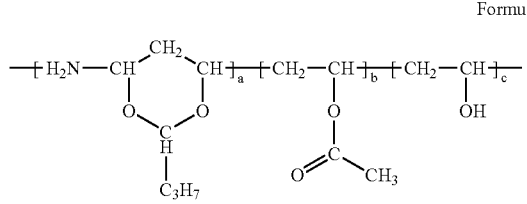
Formula 3 wherein a is 60 to 90 mol %, b is 0 to 10 mot%, and c is 0 to 40 mol %.

11. The organic photoreceptor of claim 7, wherein the overcoat layer further comprises a hydrolysis catalyst in an amount of 5 to 20 parts by weight based on 100 parts by weight of the organic silane compound represented by Formula 1.

12. The organic photoreceptor of claim 11, wherein the hydrolysis catalyst is acetic acid.

13. The organic photoreceptor of claim 7, wherein the thermal treatment is performed at a temperature in the range of 80 to 140° C.

14. The organic photoreceptor of claim 7, wherein the solvent is a cosolvent of at least one alcoholic solvent selected from the group consisting of methanol, ethanol, isopropanol and butanol, and water, and the amount of the solvent is in the range of 400 to 9900 parts by weight based on 100 parts by weight of solid content of the overcoat layer forming composition.

15. The organic photoreceptor of claim 7, wherein the overcoat layer has a thickness of 0.1 to 10 μm.

16. The organic photoreceptor of claim 7, wherein the photosensitive layer is one of:
   a single layered structure having a charge generating material and a charge transport material; and
   a dual-layered structure having a charge generating layer comprising a charge generating material and a charge transport layer comprising a charge transport material.

17. An organic photoreceptor cartridge of an image forming apparatus, the cartridge having an electrophotographic organic photoreceptor with an overcoat layer installed therein, the organic photoreceptor cartridge comprising:
   an electrophotographic organic photoreceptor having an overcoat layer comprising:
      a conductive base;
      a photosensitive layer formed on the conductive base; and
      an overcoat layer formed on the photosensitive layer and having a product obtained by coating and thermally treating an overcoat layer forming composition comprising an organic silane compound represented by Formula 1, an acrylic polymer, a polyvinyl butyral resin and a solvent:

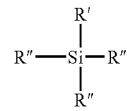
Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or a halogen atom, wherein the acrylic polymer is a methyl methacrylate-methacrylic acid copolymer represented by Formula 2, and the amount thereof is in the range of 10 to 200 Darts by weight based on 100 parts by weight of the organic silane compound represented by Formula 1:

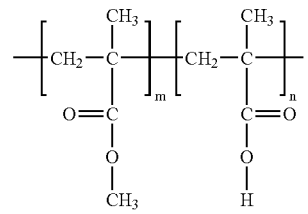
Formula 2 wherein m is 10 to 50 mol %. and n is 50 to 90 mol %, and
   wherein the overcoat layer further comprises a hydrolysis catalyst in an amount of 5 to 20 parts by weight based on 100 parts by weight of the organic silane compound represented by Formula 1; and
   a charging device that charges the electrophotographic organic photoreceptor;
   a developing device that develops an electrostatic latent image formed on the electrophotographic organic photoreceptor and a cleaning device which cleans a surface of the electrophotographic organic photoreceptor,
wherein the organic photoreceptor cartridge is attachable to and detachable from the image forming apparatus.

18. An organic photoreceptor drum for an image forming apparatus, comprising:
   a drum having an electrophotographic organic photoreceptor installed thereon, wherein the electrophotographic organic photoreceptor comprises:
   an electrophotographic organic photoreceptor having an overcoat layer comprising:
      a conductive base coated on the drum;
      a photosensitive layer formed on the conductive base; and
      the overcoat layer formed on the photosensitive layer and having a product obtained by coating and thermally treating an overcoat layer forming composition comprising an organic silane compound represented by Formula 1, an acrylic polymer, a polyvinyl butyral resin and a solvent:

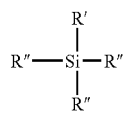

Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or a halogen atom, wherein the acrylic polymer is a methyl methacrylate-methacrylic acid copolymer represented by Formula 2, and the amount thereof is in the range of 10 to 200 parts by weight based on 100 parts by weight of the organic silane compound represented by Formula 1:

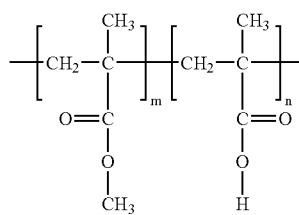

Formula 2 wherein m is 10 to 50 mol %, and n is 50 to 90 mol %, and
wherein the overcoat layer further comprises a hydrolysis catalyst in an amount of 5 to 20 parts by weight based on 100 parts by weight of the organic silane compound represented by Formula 1, and
wherein the drum is attachable to and detachable from the image forming apparatus.

19. An image forming apparatus comprising:
a photoreceptor unit comprising an electrophotographic organic photoreceptor having an overcoat layer comprising:
   a conductive base;
   a photosensitive layer formed on the conductive base; and
   an overcoat layer formed on the photosensitive layer and having a product obtained by coating and thermally treating an overcoat layer forming composition comprising an organic silane compound represented by Formula 1, an acrylic polymer, a polyvinyl butyral resin and a solvent:

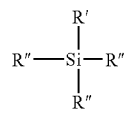

Formula 1 wherein R' is at least one selected from the group consisting of a $C_1$–$C_{20}$ alkyl, phenyl, vinyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group, and R", which is a hydrolyzable functional group, is a $C_1$–$C_{20}$ alkoxy group or a halogen atom;
wherein the overcoat layer further comprises a hydrolysis catalyst in an amount of 5 to 20 parts by weight based on 100 parts by weight of the organic silane compound represented by Formula 1,
   wherein the acrylic polymer is a methyl methacrylate-methacrylic acid copolymer represented by Formula 2, and the amount thereof is in the range of 10 to 200 parts by weight based on 100 parts by weight of the organic silane compound represented by Formula 1:

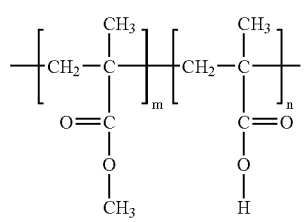

Formula 2 wherein m is 10 to 50 mol %, and n is 50 to 90 mol %;
a charging device which charges the photoreceptor unit;
an imagewise light irradiating device which irradiates the charged photoreceptor unit with imagewise light to form an electrostatic latent image on the photoreceptor unit a developing device which develops the electrostatic latent image with a toner to form a toner image on the photoreceptor unit; and
a transfer device which transfers the toner image onto a receiving material.

* * * * *

UNITED STATES PATENT AND TRADEMARK OFFICE
CERTIFICATE OF CORRECTION

PATENT NO. : 7,132,208 B2  Page 1 of 1
APPLICATION NO. : 10/413399
DATED : November 7, 2006
INVENTOR(S) : Nam-jeong Lee et al.

It is certified that error appears in the above-identified patent and that said Letters Patent is hereby corrected as shown below:

On the title page item (56), (Other Publications), Line 3, change "et. al," to --et al.,--.

Column 13, Line 20, after "10" change "mot%," to --mol%,--.

Column 13, Line 47, after "material;" change "and" to --or--.

Column13, Line 56, before "electrophotographic" change "an" to --the--.

Column 13, Line 56, after "having" change "an" to --the--.

Column 14, Line 61, before "overcoat" change "an" to --the--.

Column 14, Line 20, change "Darts" to --parts--.

Column 14, Line 35, after "50 mol%" change "." to --,--.

Column 15, Line 49, before "overcoat" change "an" to --the--.

Column 16, Line 18, after "atom" change ";" to --,--.

Column 16, Line 45, after "unit" insert --,--.

Signed and Sealed this

Thirteenth Day of March, 2007

JON W. DUDAS
*Director of the United States Patent and Trademark Office*